Figure 1:
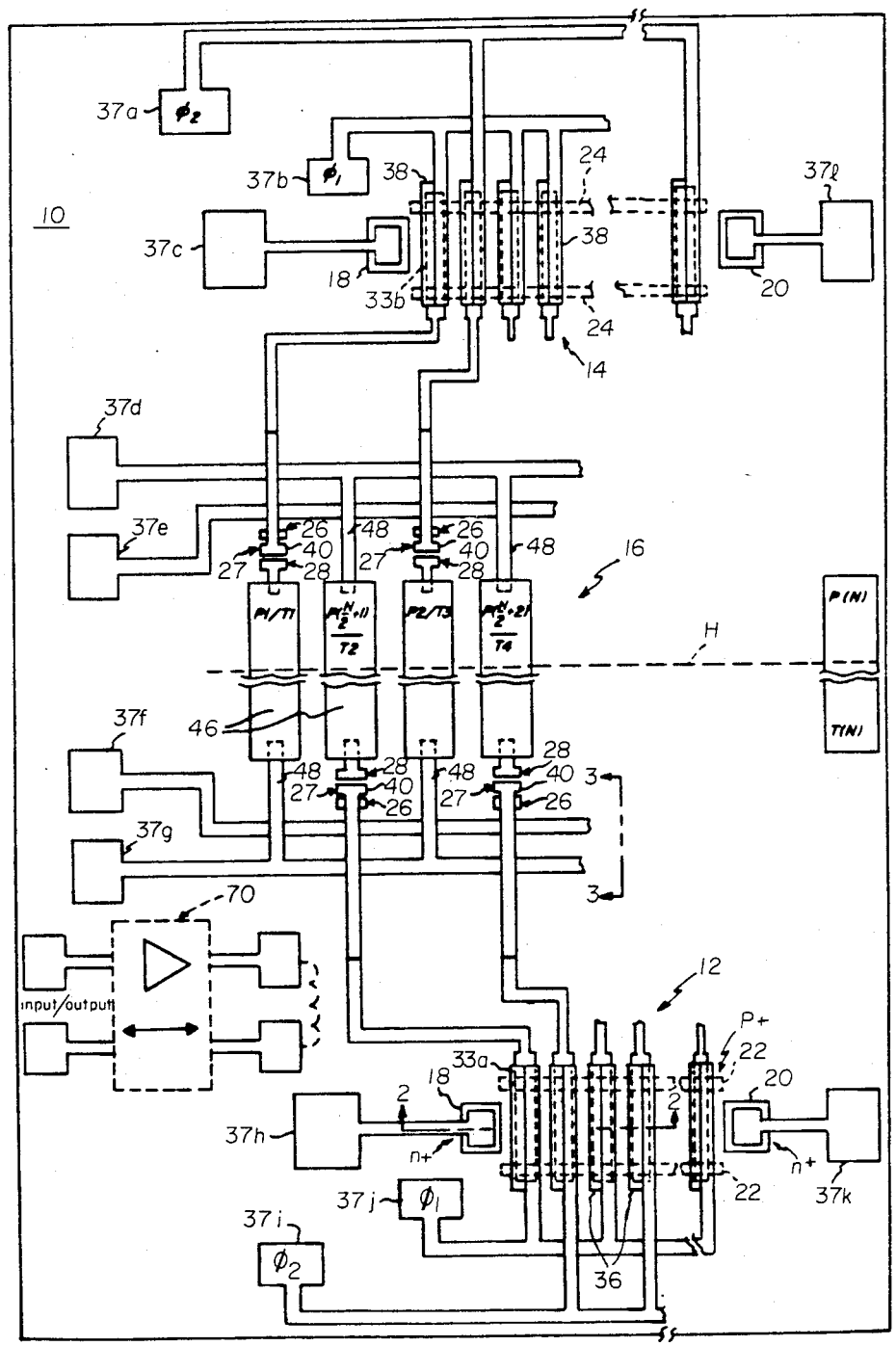

United States Patent [19]

Lemke

[11] Patent Number: 4,550,492

[45] Date of Patent: Nov. 5, 1985

[54] METHOD OF MANUFACTURING A MULTITRACK MAGNETIC HEAD

[75] Inventor: James U. Lemke, Del Mar, Calif.

[73] Assignee: Eastman Kodak Company, Rochester, N.Y.

[21] Appl. No.: 610,906

[22] Filed: Jul. 2, 1984

Related U.S. Application Data

[62] Division of Ser. No. 254,249, Apr. 15, 1981, Pat. No. 4,477,853.

[51] Int. Cl.[4] .............................................. G11B 5/42
[52] U.S. Cl. ...................................... 29/603; 360/121
[58] Field of Search ................... 29/603; 360/119–126

[56] References Cited

U.S. PATENT DOCUMENTS

| 3,564,522 | 2/1971 | Stevens, Jr. | 360/63 |
| 3,986,210 | 10/1976 | Sugaya et al. | 360/123 |
| 4,175,291 | 11/1979 | Spence | 365/178 X |
| 4,188,671 | 2/1980 | Lynes | 365/178 X |
| 4,251,910 | 2/1981 | Griffith | 29/603 |

Primary Examiner—Carl E. Hall
Attorney, Agent, or Firm—Robert F. Cody

[57] ABSTRACT

Batch practices of magnetic film deposition and circuit structuring are merged upon a common semiconductor substrate (chip) for both circuit and head parts. As to any one head being formed, the substrate is suitably doped and metallized to form electronics designed for cooperation with such head; then, thin films (cores) of magnetic material are deposited on the semiconductor substrate for cooperation with the electronics. After the thin film head cores are appropriately gapped, a (common) yoke is brought into contact with them ... the substrate being thereafter contoured through its underside to expose the thin film core gaps.

3 Claims, 9 Drawing Figures

METHOD OF MANUFACTURING A MULTITRACK MAGNETIC HEAD

This is a division of application Ser. No. 254,249, filed Apr. 15, 1981, now U.S. Pat. No. 4,477,853.

BACKGROUND OF THE INVENTION

1. Field of the Invention

This invention relates in general to multitrack magnetic heads and to methods and parts for forming such heads.

2. Description Relative to the Prior Art

In the art of magnetic recording, there is a trend toward the use of multitrack magnetic heads having large numbers of cores per unit width across the head surface that interacts with the recording medium. One explanation for this trend may be found in the fact that a plurality of head cores can record a specific amount of data at an information writing speed which is only about $$\frac{1}{\text{number of active cores}}$$

of the information writing speed which would be required when writing with only one core. For example, for a playback gap length of, say, $100\mu''$ ($\mu''$=microinch), a bandwidth of 2 MHz would necessitate a single core writing speed of 200 inches per second (ips) if use of the recording medium is to be optimized. By contrast (still using playback gap lengths of $100\mu''$), that same bandwidth of 2 MHz can be written by a 500-track record head at a relative head-to-medium speed of only 0.4 ips (i.e., $$\frac{2 \times 10^6}{500} \times 100 \times 10^{-6} = 0.4 \text{ ips}).$$

Such recording of a large bandwidth in a large number of tracks at low writing speed suggests, among other things, the linear tape recording of video information. Linear tape recording of video information, as opposed to the recording techniques employed in helical scan and quadruplex video recorders, implies a simplification of hardware: not only does a lessened information writing speed relax the mechanical demands of the recording operation, but head switching, rotary head drums, and various electronics are obviated, as well.

With the above as background, consider for a moment a multitrack magnetic record head comprised of a stack of head cores with their respective gaps aligned along a gap line; and imagine, for example, a common signal-carrying coil linking all such cores. By successively turning ON, and OFF, each core in the stack by means of a respective ancillary control, each core will take a time-division sample of the signal in the common coil . . . and if the line of core gaps is in contact with a recording medium (magnetic tape), a plurality of time-division samples will be recorded in respective tracks of the medium. Such a scanning magnetic head has been the vision of those in the video recording field for some time, whereby the whole concept of linear video recording would become commercially practicable. By time-division sampling of, say, an NTSC video signal, each picture element of each line could be recorded in a respective track at a low relative head-to-tape speed. In a similar way, playback of such a multitrack recording could be effected by successively switching ON, and OFF, the cores in the stack, thereby to induce, successively, corresponding element signals in the common coil which links the cores.

Various techniques are known for selectively, and individually, switching head cores ON and OFF: See, for example, U.S. patent applications Ser. No. 133,076 and 127,278.

Turning, for the moment, from the matter of the aforenoted use of a scanning magnetic head, it will be appreciated that certain processes for the fabrication of head parts, and components useful therewith, are susceptible to batch-fabrication techniques. U.S. Pat. No. 4,158,213, for example, teaches the use of deposited thin magnetic films on non-magnetic substrates as one vehicle for use in the manufacture of many multitrack magnetic heads at one time. Similarly, the relatively recent commercial introduction of integrated circuits, including such structures as charge-coupled devices (CCDs), which utilize metal-oxide-semiconductor (MOS) technology, was brought about, to a great extent, by the cost-saving batch-processing of semiconductor silicon wafers having selectively gaseously doped diffusions, and photolithographically produced metallic electrodes.

SUMMARY OF THE INVENTION

The invention is directed to an improved scanning magnetic head that is especially susceptible to batch fabrication: In providing the scanning magnetic head of the invention, the prior art batch practices of magnetic film deposition and circuit structuring are merged upon a common semiconductor substrate (chip) for both circuit and head parts. As to any one head being formed, the substrate is suitably doped and metallized to form electronics designed for cooperation with such head; then, thin films (cores) of magnetic material are deposited on the semiconductor substrate for cooperation with the electronics. After the thin film head cores are appropriately gapped, a common) yoke is brought into contact with them . . . the substrate being thereafter contoured through its underside to expose the thin film core gaps.

Figure 2:
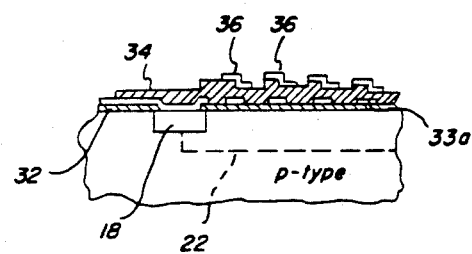
Figure 3:
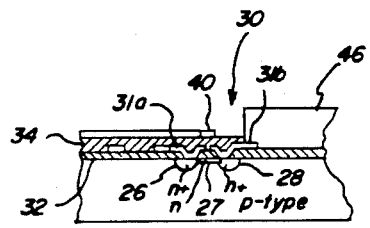
Figure 4:
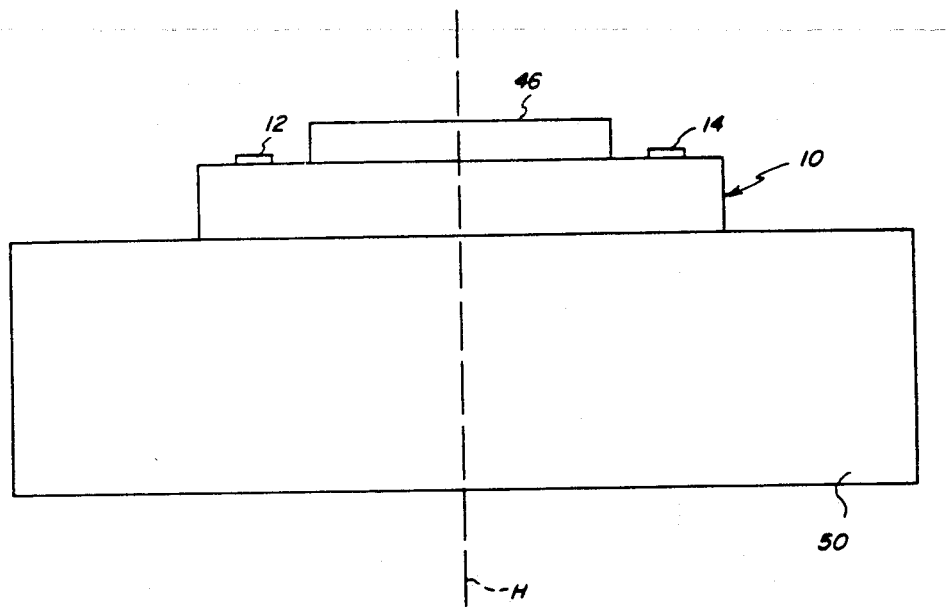
Figure 5:
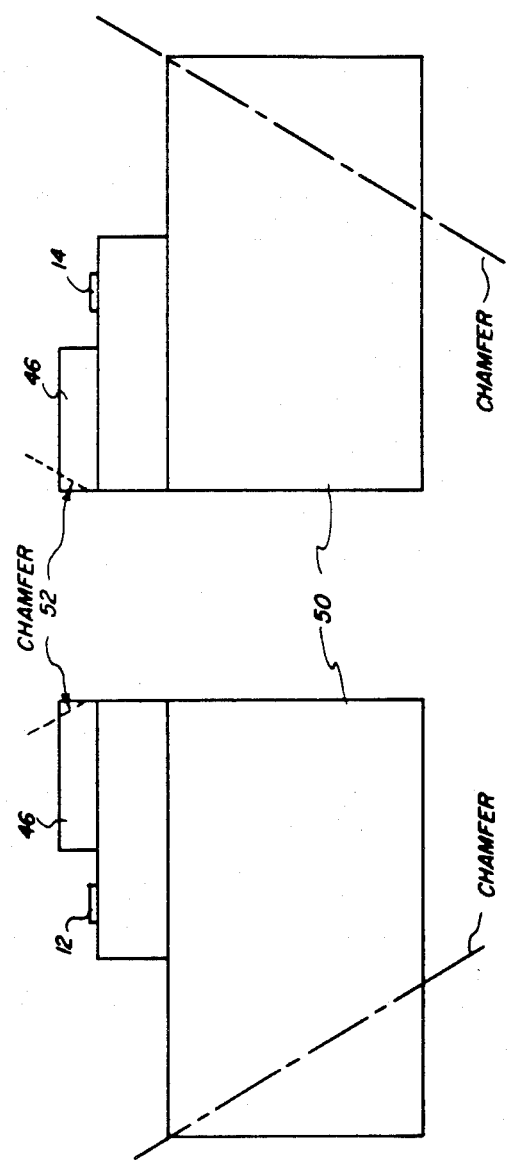
Figure 6:
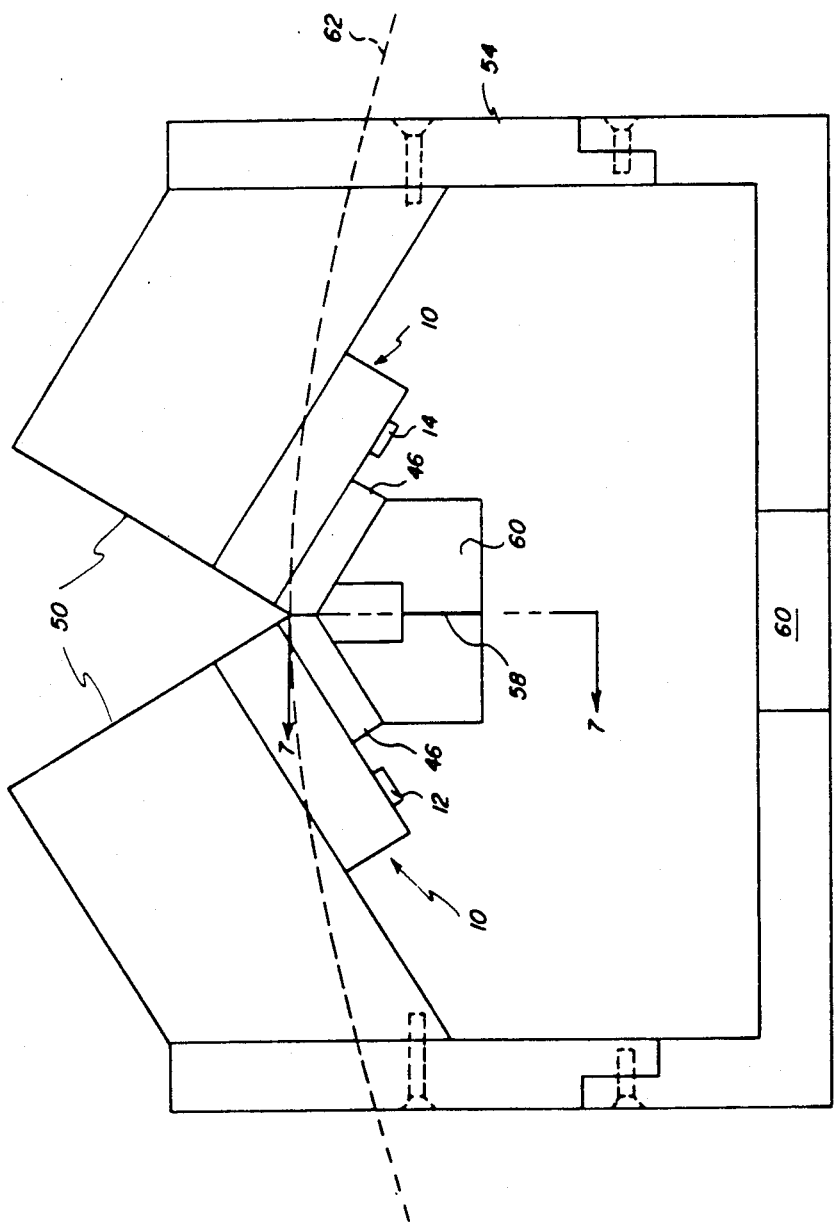
Figure 7:
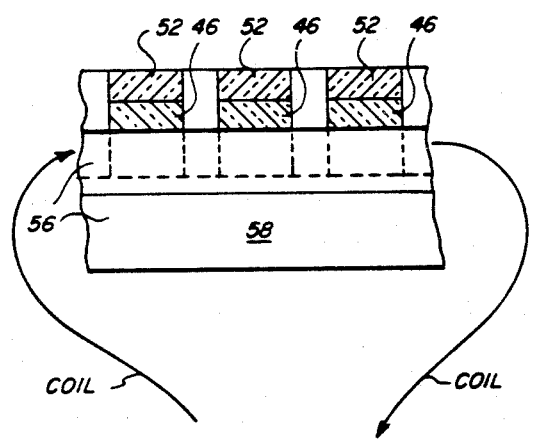
Figure 8:
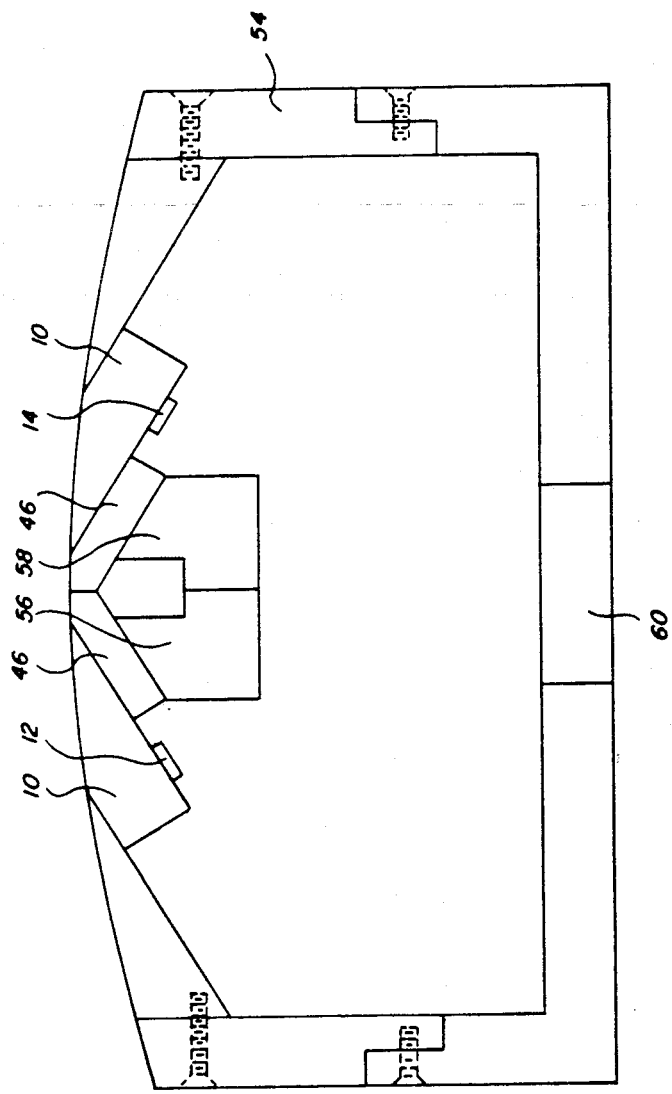
Figure 9:
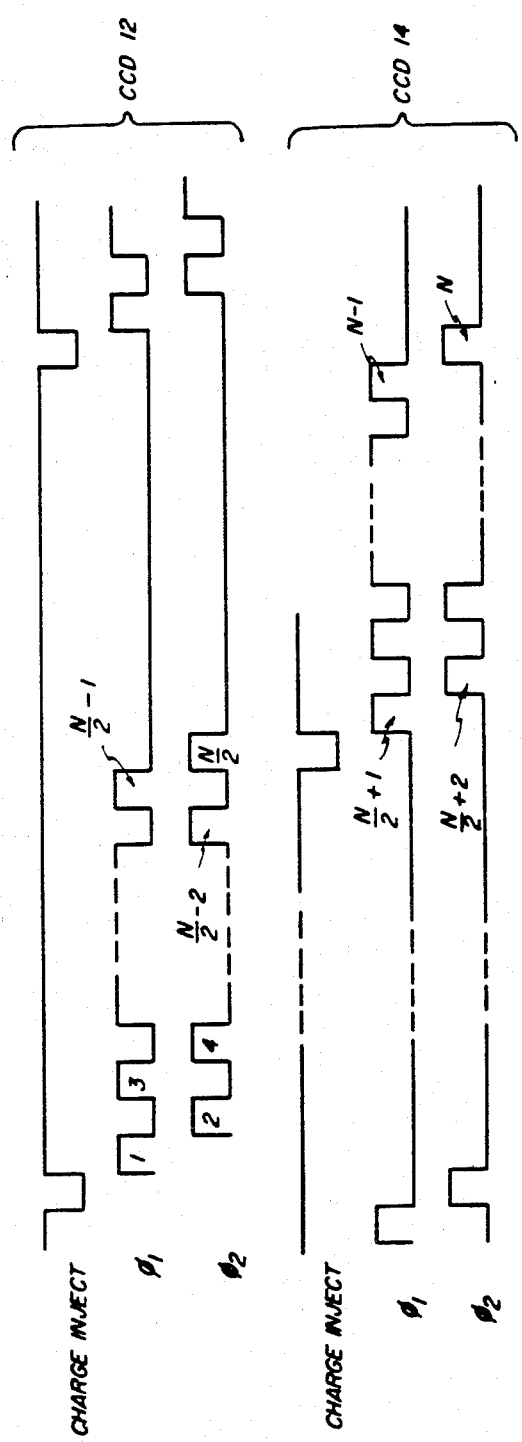

The invention will now be described with reference to the figures wherein:

FIG. 1 illustrates the layout of a semiconductor chip employed in the practice of the invention, FIG. 2 is a side elevational view taken along line 2—2 of FIG. 1, FIG. 3 is a side elevational view taken along line 3—3 of FIG. 1, FIGS. 4–8 depict various procedural steps employed in the manufacture of a head according to the invention, and FIG. 9 depicts the temporal relationships among signals employed in the practice of the invention.

Referring to the not-to-scale views of FIGS. 1–3, an appropriately doped silicon chip 10—batch fabricated along with a number of other such chips, as is the practice in the integrated circuit industry—is comprised of first and second CCDs 12,14 and an array of magnetic films 16. The chip 10, in this form of the invention, is made of p-type silicon which is appropriately doped to provide electronic components: Highly doped n-type diffusions 18 are made in the chip 10 to serve as input diodes for the CCDs 12, 14; and highly doped n-type diffusions 20 are made in the chip 10 to serve as output diodes for such CCDs. Highly doped p-type diffusions 22, 24 are also made in the chip; and such diffusions serve as channel stops for the CCDs 12,14. While providing the n-type diffusions 18, 20, n-type diffusions 26, 27, 28 are also made in the chip, these diffusions serving respectively as sources, gates, and drains for depletion-mode switching field effect transistors (FETs) 30. (Thus, a negative voltage applied to a FET gate causes the corresponding FET to turn OFF.)

Having produced diffusions of dopants for the desired electronics (which may include active components such as head amplifiers and modulators, and passive components such as filters, equalizers and attenuators for signals applied to and received from the head in question) an oxide layer 32 is grown over the chip 10. Appropriate windows are then formed in the oxide layer 32 by photolithographic techniques known to those in the art; and then, in a first metallization, metal (aluminum) electrodes are deposited—via photolithographically defined masks—atop the oxide layer. Certain of the aluminum electrodes (e.g. electrodes 31a, 31b) make contact with diffusions through the windows in the oxide layer, whereas other such electrodes (e.g. electrodes 33a, 33b) "float" atop the oxide layer for purposes of charge sensing vis-a-vis the CCDs 12, 14. See FIGS. 2 and 3.

With the regions to be occupied by the magnetic films 16 (as well as selected other sites such as input/output electrode pads 37a-371) photolithographically masked off, a second oxide layer 34 is grown over the first metallization aluminum electrode structures. In this form of the invention, the oxide layer 34 is (via photolithography) provided with a stepped topography in the region of the CCDs 12, 14 thereby to accommodate stepped metallic (aluminum) electrodes 36, 38 (second metallization) that overlay the first metallization "float" electrodes 33a, 33b. Thus, the CCDs, as employed herein, are two-phase devices as taught in *Charge Transfer Devices*, by Carlo H. Séquin et al, Bell Telephone Laboratories, Inc., 1975, page 26; and the electrodes 33a, 33b cooperative therewith are floating gate electrodes which non-destructively sense the charges processed by the CCDs. See page 53 of *Charge Transfer Devices*, by Carlo H. Séquin et al. Since the floating gate electrodes 33a, 33b are coupled to respective FET gate electrodes 40 formed during the second metallization, the CCDs 12, 14—when two-phase clocked—act as shift registers which successively gate OFF the normally ON FETs comprised of diffusions 26, 27, 28. This operation will be expounded upon in detail later.

Having diffused appropriate electronics into the chip 10, discrete, comparatively thick, films 46 of electrically conductive magnetic material, such as permalloy, are deposited on the chip, each such film 46 making electrical contact with the corresponding drain 28 of a FET; and with a corresponding common electrode 48. Application of a (negative) gating voltage to a gate 40, therefore, interrupts the normally completed electrical circuit through the corresponding film 46.

The silicon chip 10 of FIG. 1 is relatively thin and fragile: To facilitate further processing, therefore, the chip 10 is bonded to a non-magnetic support 50, preferably made of aluminum. See FIG. 4. The combined support and chip is then halved along a line H, and chamfered. The chamfering operation provides gap depth definition (as will be appreciated below) for the magnetic films 46, and shaping for the support 50. See FIG. 5. Thereafter, on one or both of all of the chamfered edges 52 of the magnetic films 46, a thin film of electrically conductive, non-magnetic gap-spacer material is deposited. Such depositions of gap-spacer material are well known to those in the art. The two halves of the supported chip are then flipped over and secured within a bracket assembly 54 with their chamfered film edges 52 in face-to-face relationship with the gap-spacer material therebetween. See FIG. 6. Thus, a row of magnetic films 46 with respective non-magnetic gaps therein is produced, the thickness of the gap-spacer material being such that current flow perpendicular to any given gap will cause that gap to turn OFF as taught in U.S. patent application Ser. No. 127,278.

Either prior to, or after, the two halves of the supported chip are secured within the bracket 54, a yoke 56—common to each of the gapped magnetic films 46, as shown in FIG. 7—is "low-reluctance" bonded to the films, the yoke 56 having an electrically non-conductive spacer 58 therein. Because the yoke 56 is common to each of the films, there is virtually no need for concern about aligning "front" head parts with respective "back" head parts, a feature which is of considerable significance. An electrical coil winds on the yoke 56, its leads (as well as leads which are to and from the bonding pads 37 on the chip 10) being brought out via a connector adapted to be secured to the FIG. 6 structure at 60. Then, the FIG. 6 structure is finished into a multitrack magnetic head by contouring along the line 62. The finished head is depicted in FIG. 8.

To understand the operation of a scanning multitrack head according to the invention, reference should again be had to the structure of FIG. 1. In considering such structure, assume that it has an electrically conductive non-magnetic gap line coextensive with the line H, as provided by the head fabrication processes associated with FIGS. 5-8; and imagine that an appropriate voltage is applied across bonding pads 37e, 37g, and across bonding pads 37f, 37d. Further, assume (for the moment) that no clocking voltages are applied to the bonding pads 37i, 37j, 37a, and 37b. Thus, all FET gates 40 do not receive a "negative" signal; and, therefore, current flows through all film gaps, causing all such film gaps to be OFF, as taught in copending U.S. patent application Ser. No. 127,278.

Now, with the above as background, consider, by way of example, the application of a negative pulse to the diode 18 associated with the CCD 12; and consider further that positive-going two-phase clock voltages are applied to the pads 37i, 37j: The negative pulse injects charges (electrons) into the chip substrate and, under control of the CCD clocking voltages, such charges are passed successively from one CCD stage to another, ultimately being collected at the output diode 20 and dissipated in a load not shown). In response to charges received at any given CCD stage, the underlying floating gate electrode 33a causes the corresponding FET gate to go negative. This, in turn, causes the FET in question to stop conducting, thereby turning ON the film gap associated with the FET.

FIG. 9 indicates the temporal relationships among the various pulses applied to the electronics depicted in FIG. 1, the numbers (1 to N) associated with the $\phi_1$, $\phi_2$ clock pulses corresponding to the numbers of the tracks T of the head. After charge is injected into the chip 10 in the vicinity of the CCD 12, the clocking pulses $\phi_1$, $\phi_2$ successively pass such charges from one CCD stage to another, thereby successively turning ON the head gaps associated with the head tracks 1 to N/2, after which charge is injected into the chip 10 in the vicinity of the CCD 14. Then, the CCD 14 successively turns ON the head gaps associated with the head tracks $$\left(\frac{N}{2}+1\right)$$

N.

With, for example, an NTSC signal applied to the common coil wound on the yoke 56, the successive turning ON of the head gaps causes discrete picture element (pixel) samples to be taken (and recorded) by the head, the notation P1 to P(N) in FIG. 1 indicating the number, within any given video line, of the picture element recorded by the gap in question. Thus, it will be appreciated, in this embodiment of the invention, the first pixel P1 of a line of video information is recorded in track T1, the second pixel P2 is recorded in track T3, the third pixel P3 is recorded in track T5, and so on, until one-half the video line is recorded; then, the first pixel $$P\left(\frac{N}{2}+1\right)$$

of the second half of the video line is recorded in track T2, the second pixel $$P\left(\frac{N}{2}+2\right)$$

of the second half of the line in track T4, and so on, until the last pixel P(N) of the video line is recorded in the last track T(N). Then, the next video line of the NTSC signal is similarly recorded, etc. (Playback of pixel signal information is achieved, as taught in U.S. patent application Ser. No. 127,278, by sampling recorded information pixel-by-pixel under control of the same clocking signals as employed during the above-described recording process.)

It is worthy to note that in the structure of FIG. 1, the normally ON current flow in adjacent films is always in opposite directions. Such a practice has the desirable effect of precluding unwanted magnetization of the films because (except for the films associated with the first and last tracks) each such film is subject to oppositely oriented inductions caused by oppositely directed current flow in its two adjacent films.

The invention has been described in detail with particular reference to preferred embodiments thereof, but it will be understood that variations and modifications can be effected within the spirit and scope of the invention. For example, although one particular mode of successively turning ON the gaps of the thin film cores is depicted and described herein, other core enabling techniques, such as by selectively magnetically biasing discrete cores, or by use of selectively saturable magnetic gaps, may be employed in the practice of the invention. Further, as noted above, and as depicted at 70 in FIG. 1, the silicon chip 10 may, according to the invention, be appropriately doped additionally to provide electronics useful in processing the signals applied to, and received from, the coil commonly wound about the yoke 56.

What is claimed is:

1. A method of making an integrated magnetic head comprising the steps of
   (a) doping parts of a semiconductor wafer to form electronic components therein,
   (b) depositing a film of magnetic material on parts of said wafer for cooperation with said electronic components,
   (c) cutting said wafer into parts through said films of magnetic material,
   (d) depositing non-magnetic material on one or more of the edges of said film formed by cutting said wafer into parts, and
   (e) holding said wafer parts in side-by-side relationship with said non-magnetic material therebetween so as to form a transducer gap between the two parts of said magnetic film.

2. The method of claim 1 wherein doping said wafer and depositing magnetic material thereon are effected on the same face of said wafer, and wherein said method includes the additional step of contouring through said wafer from the other face thereof to expose said transducer gap.

3. The method of claim 2 including the additional step of mounting said wafer at said other face thereof to a non-magnetic support, and wherein said wafer is contoured therethrough to expose said transducer gap by contouring through said support.

* * * * *